(12) United States Patent
Wang et al.

(10) Patent No.: US 12,145,254 B2
(45) Date of Patent: Nov. 19, 2024

(54) INSPECTION ROBOT AND LIFTING APPARATUS THEREOF

(71) Applicant: Jingdong Technology Information Technology Co., Ltd., Beijing (CN)

(72) Inventors: Hui Wang, Beijing (CN); Gengxun Xie, Beijing (CN); Chongshan Wang, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 387 days.

(21) Appl. No.: 17/636,768

(22) PCT Filed: Aug. 13, 2020

(86) PCT No.: PCT/CN2020/108846
§ 371 (c)(1),
(2) Date: Feb. 18, 2022

(87) PCT Pub. No.: WO2021/047344
PCT Pub. Date: Mar. 18, 2021

(65) Prior Publication Data
US 2022/0339792 A1    Oct. 27, 2022

(30) Foreign Application Priority Data
Sep. 10, 2019   (CN) .......................... 201921495350.4

(51) Int. Cl.
*B25J 11/00*          (2006.01)
*B25J 5/00*           (2006.01)
(Continued)

(52) U.S. Cl.
CPC ............... *B25J 11/00* (2013.01); *B25J 5/007* (2013.01); *F16M 11/046* (2013.01);
(Continued)

(58) Field of Classification Search
CPC ......... B25J 11/00; B25J 5/007; F16M 11/045; F16M 11/046; F16M 11/18; F16M 11/24;
(Continued)

(56) References Cited

FOREIGN PATENT DOCUMENTS

| CN | 108436943 A | * | 8/2018 | ............. | B25J 11/00 |
| CN | 108500991 A | * | 9/2018 | ............. | B25J 11/00 |

(Continued)

OTHER PUBLICATIONS

International Search Report dated Nov. 18, 2020 for PCT application No. PCT/CN2020/108846.
Supplementary European Search Report dated Jul. 25, 2023 regarding Application No. PCT/CN2020108846.

*Primary Examiner* — David L Singer

(57) ABSTRACT

An inspection robot and a lifting apparatus thereof, where when the inspection robot collects image data in a height direction of the inspection robot and in a large range, this can be implemented by the lifting apparatus without need to set multiple image acquisition devices in an upper and down direction, which is beneficial to reduce the cost of the inspection robot. Moreover, in the lifting apparatus, a slide and an image requisition device mounted on the slide can slide up and down relative to a supporting slide rail, and the supporting slide rail can drive the slide and the image requisition device mounted on the slide to slide up and down relative to a side rail.

17 Claims, 5 Drawing Sheets

(51) Int. Cl.
*F16M 11/04* (2006.01)
*F16M 11/18* (2006.01)
*H04N 23/54* (2023.01)
*H04N 23/695* (2023.01)
*F16M 11/42* (2006.01)

(52) U.S. Cl.
CPC ............. *F16M 11/18* (2013.01); *H04N 23/54* (2023.01); *H04N 23/695* (2023.01); *F16M 11/42* (2013.01)

(58) Field of Classification Search
CPC ........ F16M 11/42; G03B 15/03; H04N 23/51; H04N 23/54; H04N 23/695; H04N 7/18; H04N 7/183; H05B 47/11
See application file for complete search history.

(56) References Cited

FOREIGN PATENT DOCUMENTS

| | | | | | |
|---|---|---|---|---|---|
| CN | 207841317 U | * | 9/2018 | ............... | B25J 9/02 |
| CN | 109038353 A | | 12/2018 | | |
| CN | 208262854 U | | 12/2018 | | |
| CN | 109202934 A | * | 1/2019 | ............... | B25J 11/00 |
| CN | 109397241 A | * | 3/2019 | ............... | B25J 5/007 |
| CN | 109822592 A | | 5/2019 | | |
| CN | 208856268 U | * | 5/2019 | ............... | B65G 1/04 |
| CN | 209038957 U | * | 6/2019 | ............... | B66F 7/00 |
| CN | 210824300 U | | 6/2020 | | |
| KR | 20180055025 A | * | 5/2018 | ............... | B25J 11/00 |

\* cited by examiner

INSPECTION ROBOT AND LIFTING APPARATUS THEREOF

CROSS-REFERENCE TO RELATED APPLICATIONS

The present application is a National Stage of International Application No. PCT/CN2020/108846, filed on Aug. 13, 2020, which requires the priority of Chinese patent application No. 201921495350.4, field before China National Intellectual Property Administration on Sep. 10, 2019, titled on "INSPECTION ROBOT AND LIFTING APPARATUS THEREOF". The contents of the above applications are incorporated herein by reference in their entireties.

TECHNICAL FIELD

The present disclosure relates to an intelligent robot technique, and in particular, to an inspection robot and lifting apparatus thereof.

BACKGROUND

Internet Data Center, i.e. IDC, with the development of the big Data and the cloud computing, shows an explosive growth in IT infrastructures, it is very necessary to perform inspection on IT infrastructures. In order to improve efficiency of the inspection, the inspection robot came into being.

At present, in order to make the inspection robot achieve image data acquisition in the height direction and in a large range, it is usually to set up multiple image acquisition devices on the inspection robot, the multiple image acquisition devices are arranged along the height direction of the inspection robot, so that different image acquisition devices cover different height spaces. However, using multiple image acquisition devices cause a high cost of the inspection robot.

SUMMARY

One aspect of the present disclosure is to provide a lifting apparatus of an inspection robot, which is mounted to a robot body of the inspection robot, including: a mounting base, configured to be mounted to a body of the inspection robot; an electric cylinder with a first end and a second end opposite to the first end, with the first end being connected with the mounting base; a side rail, connected with the mounting base; a supporting slide rail, slidably connected with the side rail and connected with the second end of the electric cylinder, so that the electric cylinder drives the supporting slide rail to slide relative to the side rail; a driving mechanism, mounted to the supporting slide rail; and a slide, configured to mount an image acquisition device, where the slide is connected with the driving mechanism, and the slide is slidably connected with the supporting slide rail, so that the driving mechanism is capable of driving the slide to slide relative to the supporting slide rail.

The lifting apparatus further comprises: a rack, connected with the mounting base and/or the side rail; the driving mechanism comprises: a transmission shaft, connected, by a bearing, with a bottom of the supporting slide rail facing the mounting base; a gear, disposed at one end of the transmission shaft, and engaged with the rack; a first driving wheel, disposed at the other end of the transmission shaft; a second driving wheel, disposed at a top end of the supporting slide rail and opposite to the first driving wheel; and an annular connecting member, disposed around the first driving wheel and the second driving wheel, and connected with the slide.

The first driving wheel comprises: a synchronous wheel, disposed at the other end of the transmission shaft; a synchronous belt idler, disposed at the top end of the supporting slide rail and opposite to the synchronous wheel; and a synchronous belt, connected with the synchronous wheel and the synchronous belt idler; with the synchronous wheel being connected with the slide.

The electric cylinder, the annular connecting member and the rack are disposed side by side and at intervals; and the annular connecting member is located between the electric cylinder and the rack.

The supporting slide rail comprises two opposite and parallel slide rail side walls, wherein one slide rail side wall is provided with a bearing hole, the bearing is provided in the bearing hole; the gear is located on an outer side of the slide rail side wall with the bearing hole and facing the side rail; the first driving wheel is located on an inner side of the slide rail side wall with the bearing hole.

The supporting slide rail comprises a support body and two linear rails mounted to the support body, the two linear rails are provided in parallel and at an interval, and the slide cooperates with the two linear rails.

The side rail is provided with a guide slot; a side edge of the supporting slide rail is slidably provided in the guide slot; or the side edge of the supporting slide rail is provided with a roller, the roller is rollably provided in the guide slot.

The second end of the electric cylinder is connected with a top seat, and the top seat is connected with the supporting slide rail; the top seat is configured to be rested on a top end of the side rail when the supporting slide rail moves to a lower limit position relative to side rail.

There is a plurality of side rails, the plurality of side rails are provided in parallel and at intervals; two of the plurality of side rails are respectively provided at both sides of the supporting slide rail.

Another aspect of the present disclosure is to provide an inspection robot, including a robot body and the lifting apparatus described according to any of the above items; where a mounting base of the lifting apparatus is connected with a robot chassis of the robot body.

The technical effect of the one aspect of the present disclosure is: the lifting apparatus has a primary lifting mechanism consisting of the electric cylinder, the side rail and the supporting slide rail, and a secondary lifting mechanism consisting of the driving mechanism and the slide, and in the primary lifting mechanism, the supporting slide rail is capable of sliding up and down relative to a side rail, and in the secondary lifting mechanism, the slide is capable of sliding up and down relative to the supporting slide rail of the primary lifting mechanism and thus drives the image acquisition device mounted on the slide to slide up and down.

DETAILED DESCRIPTION OF EMBODIMENTS

Figure 1:
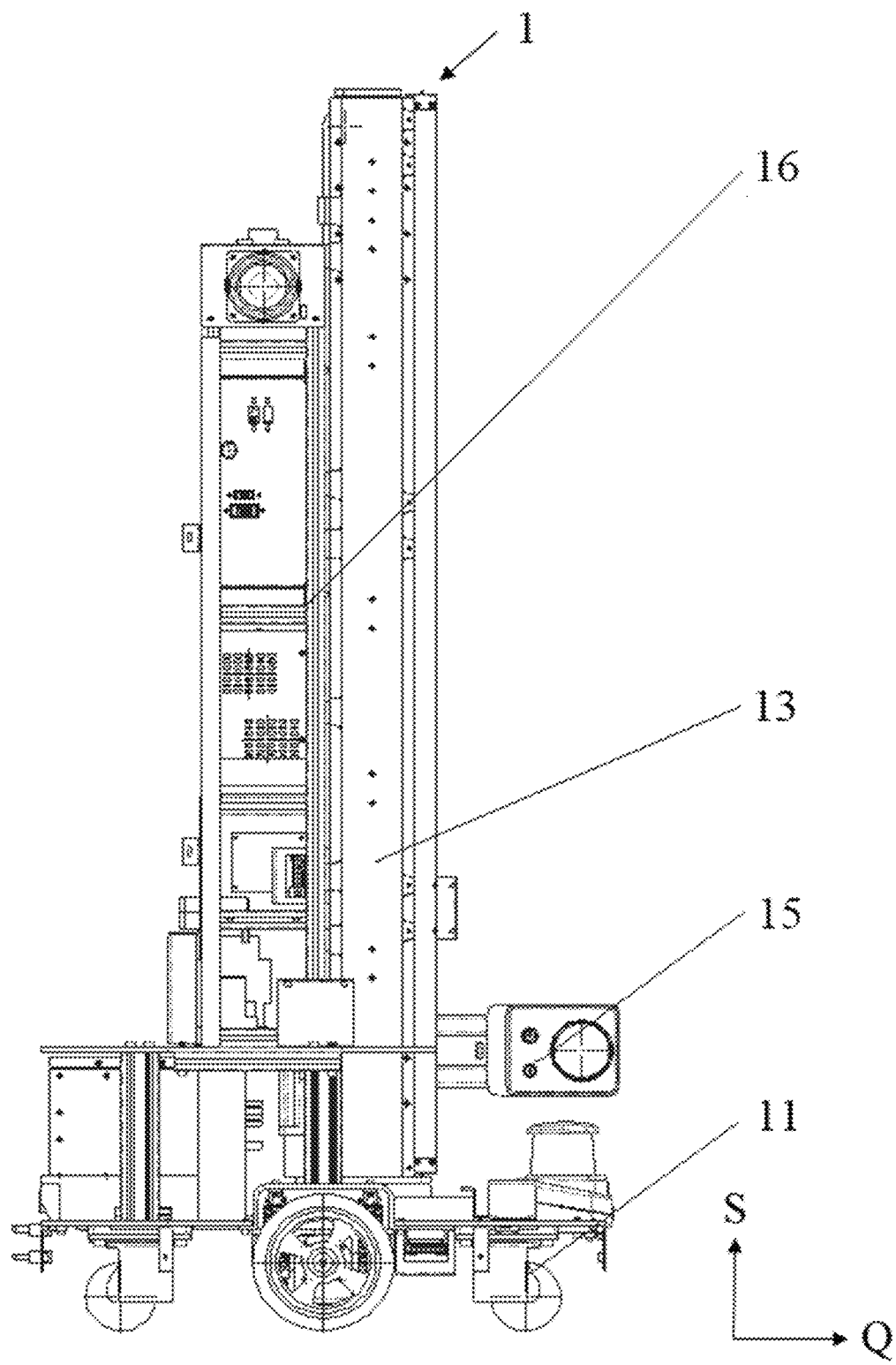
FIG. 1 is a structural schematic diagram of an inspection robot provided by an embodiment of the present disclosure.

The specific embodiments of the present disclosure are described in detail below in combination with the accompanying drawings. It should be understood that the specific embodiments described herein are only used to illustrate and explain the present disclosure, and the present disclosure is not limited to the following specific embodiments.

As shown in FIG. 1 to FIG. 5, the present embodiment provides an inspection robot 1, including a robot body and a lifting apparatus 13; the robot body has a robot chassis 11 for supporting the inspection robot 1 on a bearing surface, such as the ground; the lifting apparatus 13 may be mounted on the robot body, and specifically, on the robot chassis 11.

The lifting apparatus 13 includes: a mounting base 131, an electric cylinder 142, a side rail 132, a supporting slide rail 133, a driving mechanism and a slide 143; by mounting the mounting base 131 to the robot body of the inspection robot 1, the installation of the lifting apparatus 13 is achieved; by mounting a first end of the electric cylinder 142 and the side rail 132 to the mounting base 131, and slidably connecting the supporting slide rail 133 with the side rail 132, the driving mechanism is mounted to the supporting slide rail 133, and by the driving of the driving mechanism, the slide 143 moves relative to the supporting slide rail 133.

In this way, the slide 143 and the image acquisition device 15 mounted on the slide 143 may slide up and down relative to the supporting slide rail 133, and the supporting slide rail may also drive the slide 143 and the image acquisition device 15 mounted on the slide 143 to slide up and down relative to a side rail 132, which is beneficial to enable the slide 143 and the image acquisition device 15 mounted on the slide 143 to also have a large stroke even when the size of the lifting apparatus is set small, and thus it is beneficial to enable the image acquisition device 15 mounted on the slide 143 to have a relatively large movement range in a height direction of the inspection robot 1, so as to collect image data in different height spaces. Compared with the relative technologies where multiple image acquisition devices are used to collect image data in different height spaces, the present embodiment does not need to provide multiple image acquisition devices, and has a relative lower cost.

The structure of the inspection robot 1 provided by the present embodiment is illustrated below in combination with the accompanying drawings. For ease of description, a direction of the inspection robot 1 facing the bearing surface such as the ground is taken as bottom (or lower), and thus a side of the inspection robot 1 away from the bearing surface such as the ground is taken as top (or upper, as shown by the arrow S in the drawings); a side of the inspection robot 1 for mounting the image acquisition device 15 is taken as right (as shown by the arrow R in the drawings), and thus, a side of the inspection robot 1 opposite to the image acquisition device 15 is taken as left; the other two sides of the inspection robot 1 is taken as front (as shown by the arrow Q in the drawings) and rear.

The robot chassis 11 may be a bearing member of the inspection robot 1, and is configured to bear a main frame and functional modules of the robot, etc. The functional module may be mounted to the main frame and/or the bearing member. The functional modules may include a control module, a power module and the image acquisition device 15 and the like; where the control module is configured to control a work state of the inspection robot 1, so that the inspection robot 1 executes a corresponding action; the power module is configured to supply power to the inspection robot 1; the image acquisition device 15 is configured to collect the image data.

In some embodiments, the robot chassis 11 may be provided with a walking mechanism to make the inspection robot 1 have an automatic walking function. The walking mechanism may have multiple walking wheels, and the multiple walking wheels are set at intervals to improve the stability of the inspection robot 1. The control module may be used to control, for example, the walking speed and walking direction of the walking mechanism, so as to improve an automatic level of the inspection robot 1. It should be understood that: the structure of the walking mechanism may use a conventional setting in the field, the present embodiment does not specifically limit the structure of the walking mechanism.

Figure 2:
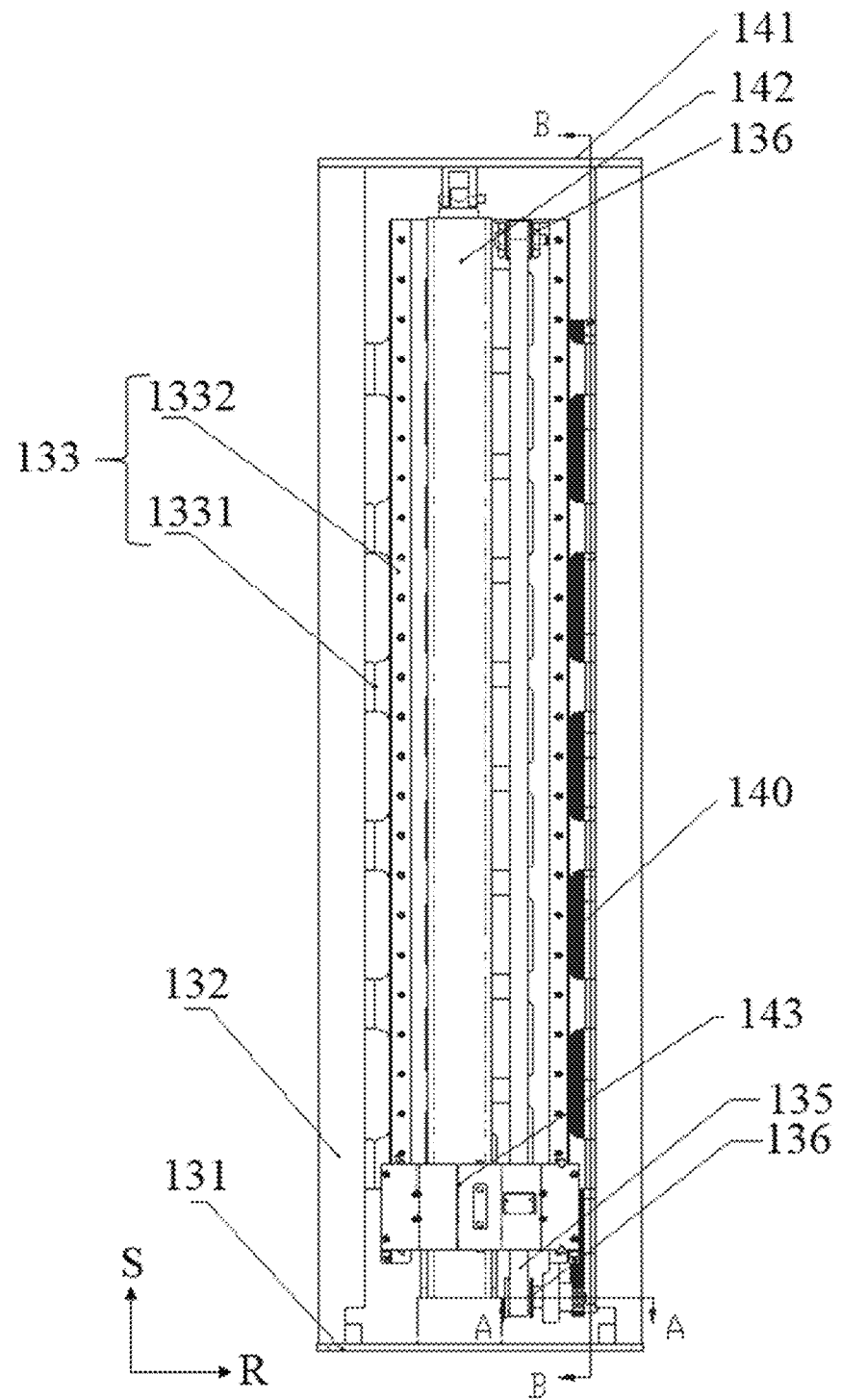
FIG. 2 is a structural schematic diagram of a lifting mechanism in an inspection robot provided by an embodiment of the present disclosure.

As shown in FIG. 2, the lifting apparatus 13 includes a mounting base 131, the mounting base 131 is configured to mount the lifting apparatus to the robot chassis 11, to enable the lifting apparatus 13 to move together with the robot body in the machine room and other places. Exemplarily, the mounting base 131 may be a plate structure or a frame structure. In some examples, the mounting base 131 may be fastened to the robot chassis 11 via a fastener such as bolt, so as to facilitate the disassembly and assembly of the lifting apparatus 13, and facilitate the overhaul and replacement of the lifting apparatus 13; where the mounting base 131 and the robot chassis 11 are provided with a fastening hole fitted with the fastener.

In other examples, the mounting base 131 may be in connection with the robot chassis 11 via welding, interference fit and other connection forms.

The lifting apparatus 13 includes the electric cylinder 142, the side rail 132 and the supporting slide rail 133. The electric cylinder 142, the side rail 132 and the supporting slide rail 133 may form a primary lifting mechanism of the lifting apparatus 13. The bottom of the side rail 132 may be fixed to the mounting base 131, and the bottom of the side rail 132 may be in connection with the mounting base 131 through fastening connection, welding, plugging, snapping and other common connection forms. The side rail 132 may be a rod or a plate extending along the height direction of the inspection robot 1.

The supporting slide rail 133 may be sliably connected with the side rail 132. One of the supporting slide rail 133 and the side rail 132 is provided with a sliding slot, and the side edge of the other is provided in the sliding slot, thereby the supporting slide rail 133 may move along an extension direction of the side rail 132, i.e., along the height direction of the inspection robot 1.

In one possible implementation, the side rail 132 is provided with a guide slot; a side edge of the supporting slide rail 133 is slidably set in the guide slot, which is beneficial to simplify the structure of the supporting slide rail 133; or, the side edge of the supporting slide rail 133 is provided with a roller 146, the roller 146 is rollably set in the guide slot, which is beneficial to reduce the friction between the supporting slide rail 133 and the side rail 132. The side rail 132 may be multiple, the multiple side rails 132 are parallel and set at intervals; two of the multiple side rails 132 are respectively provided at both sides of the supporting slide rail 133, which is beneficial to ensure that the supporting slide rail 133 can slide along an upper and lower direction. When the side rails 132 are two, the two side rails 132 are respectively provided at both sides of the supporting slide rail 133; when the side rails 132 are three, two of the side rails 132 are respectively provided at right and left sides of the supporting slide rail 133, and the other side rail 132 may be provided at the rear side of the supporting slide rail 133 or left side of the supporting slide rail 133 or right side of the supporting slide rail 133.

The electric cylinder 142 may be connected with the supporting slide rail 133 so as to drive the supporting slide rail 133 to move along the height direction of the inspection robot 1.

Exemplarily, the electric cylinder 142 may include a motor, a lead screw, a nut and cylinders, the lead screw extents along the upper and lower direction and is provided at an output end of the motor, the lead screw fits to the nut, the nut may be connected with the cylinders, the output end of the motor drives the lead screw to rotate, the lead screw drives the nut to reciprocate along an upper and lower direction, and the nut drives the cylinders together to reciprocate along the upper and lower direction. Among them, the motor and one of the cylinders together form a first end of the electric cylinder 142, and the motor and the other of the cylinders together form a second end of the electric cylinder 142, the first end and the second end are opposite to each other.

Optionally, the electric cylinder 142 may be in a communication connection with the control module of the inspection robot 1, so that the control module may control the starting and closing or the speed of the electric cylinder 142. Where the control module may be used to receive a control instruction from a terminal equipment and control the starting and closing or speed of the electric cylinder 142 according to the control instruction; or the control module may control the starting and closing or speed of the electric cylinder 142 according to a pre-stored control instruction of the inspection robot 1.

The lifting apparatus 13 further includes the driving mechanism and the slide 143. The driving mechanism and the slide 143 form a secondary lifting mechanism of the lifting apparatus 13. The slide 143 is configured to mount the image acquisition device 15. The driving mechanism is slidably provided in the supporting slide rail 143, the slide 143 is slidably connected with the supporting slide rail 133, and the driving mechanism drives the slide 143 to slide up and down along the supporting slide rail 133.

In this way, the slide 143 may slide up and down along the supporting slide rail 133, and furthermore, when the supporting slide rail 133 slides up and down along the side rail 132, the driving mechanism provided on the supporting slide rail 133 also slides up and down along the side rail 132, following the supporting slide rail 133; that is, the image acquisition device 15 mounted to the slide 143 may slide up and down along the supporting slide rail 133, and moves together with the supporting slide rail 133 when the supporting slide rail 133 slides along the side rail 132.

In this way, on one hand, when the supporting slide rail 133 slides up and down along the side rail 132, the image acquisition device 15 mounted to the slide 143 may slide up and down along with the supporting slide rail 133; on the other hand, under the action of the driving mechanism, the image acquisition device 15 mounted to the slide 143 slides up and down relative to the supporting slide rail 133, so that the sliding stroke of the image acquisition device 15 mounted to the slide 143 is larger than the sliding strokes of the electric cylinder 142 and the supporting slide rail 133.

By the inspection robot 1 of the present embodiment, collection of the image data in the height direction of the inspection robot 1 and in a large range does not need to provide multiple image acquisition devices 15 along the upper and lower direction, and may be achieved by the lifting apparatus 13 of the present embodiment, and has a relative lower cost. Moreover, the lifting apparatus 13 is provided to have the primary lifting mechanism and the secondary lifting mechanism that may slide up and down relative to the primary lifting mechanism, which not only enables the slide 143 and the image acquisition device 15 mounted to the slide 143 to have a large stroke, but also is beneficial to reduce the size of the lifting mechanism, and thus is beneficial to further reduce the cost of the inspection robot 1.

Figure 4:
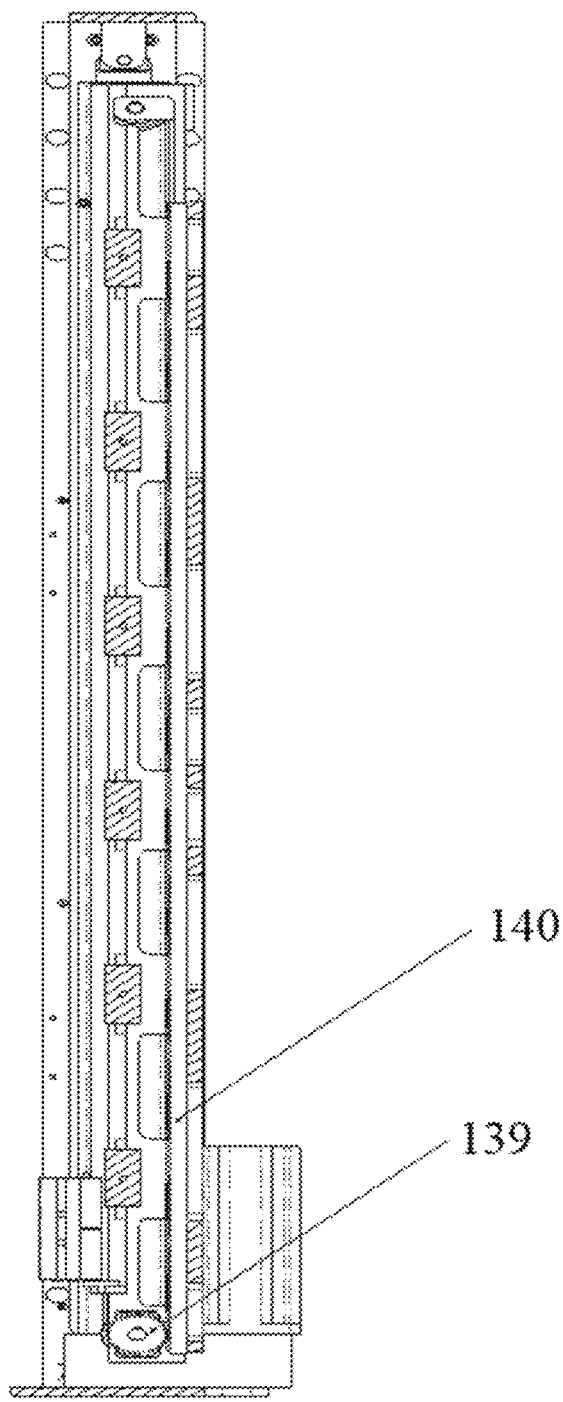
FIG. 4 is a sectional view taken along B-B of FIG. 2.

In one possible implementation, as shown in FIG. 4, the lifting apparatus 13 further includes: a rack 140, the rack 140 is connected with the mounting base 131 and/or the side rail 132. Exemplarily, the rack 140 may be disposed to the side rail 132, the rack 140 may be disposed to the side rail 132 via welding, bonding, snapping, fastening and other common connection ways, so as to ensure the rack 140 to be provided along the upper and lower direction, ensure the engagement reliability of the rack 140 with the gear 139, and facilitate the supporting slide rail 133 to slide smoothly along the side rail 132. Of course, the bottom end of the rack 140 may also be fixed to the mounting base 131, and furthermore, a support bar may be provided for supporting the rack 140, so as to ensure the rack 140 to be set along upper and lower direction.

The driving mechanism includes: a transmission shaft 137, connected with a bottom of the supporting slide rail 133 facing the mounting base 131 via a bearing 138; a gear 139, provided at one end of the transmission shaft 137, and engaged with the rack 140; a first driving wheel, disposed at the other end of the transmission shaft 137; a second driving wheel, disposed at a top end of the supporting slide rail 133 and opposite to the first driving wheel; and an annular connecting member, disposed around the first driving wheel and the second driving wheel, and connected with the slide 143.

Exemplarily, the supporting slide rail 133 may include two opposite and parallel slide rail side walls, one of the slide rail side walls is provided with a bearing hole 145, the bearing 138 is provided in the bearing hole 145; in this way, the supporting slide rail 133 and the transmission shaft 137 is rotatable relative to each other, and when the gear 139 drives the transmission shaft 137 to rotate, the movement of the supporting slide rail 133 is not affected.

Figure 3:
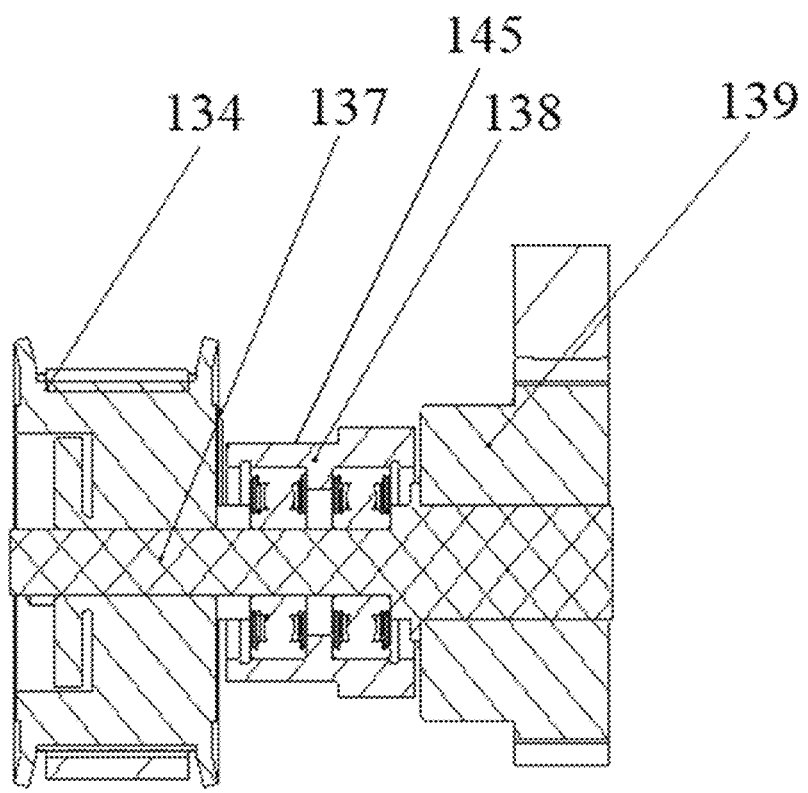
FIG. 3 is a sectional view taken along A-A of FIG. 2.

As shown in FIG. 3, the gear 139 and the first driving wheel may set at two opposite sides of the bearing 138, that is, the gear 139 is located at an outer side of the slide rail side wall with the bearing hole 145 and facing the side rail 132, the first driving wheel is located on an inner side of the slide rail side wall with the bearing hole 145; in this way, it is beneficial to make the structure of the lifting apparatus 13 more compact, so as to reduce the space occupied by the lifting apparatus 13.

Furthermore, one sides of two slide rail side walls away from a side of the slide 143 for mounting the image acquisition device 15 are in connection with a connecting plate, so as to improve the bearing capacity of the supporting slide rail 133. In this way, the slide rail side walls and the connecting plate may together form a housing space; a part of the electric cylinder 142 may be located in the housing space; at least part of the second driving wheel may be provided in the housing space; at least part of the annular connecting member may be located in the housing space; at least part of the first driving wheel may be located in the housing space; at least part of the gear 139 may be located in the housing space, and correspondingly, the supporting slide rail 133 may be provided with an avoidance portion, so that at least part of the gear 139 may be exposed through the avoidance portion and engaged with the rack 140.

By receiving at least one of the above components in the housing space, it is beneficial to make the structural of the lifting apparatus 13 compactness and to reduce the volume and occupied space of the lifting apparatus.

In some examples, the first driving wheel includes: a synchronous wheel 134, a synchronous belt idler 136 and a synchronous belt 135, the synchronous wheel 134 is provided at the other end of the transmission shaft 137, the synchronous belt idler 136 is provided at the top end of the supporting slide rail 133 and opposite to the synchronous wheel 134, the synchronous belt 135 is connected with the synchronous wheel 134 and the synchronous belt idler 136; and the synchronous wheel 134 is connected with the slide 143.

The inner surface of the synchronous belt 135 is provided with an equally spaced tooth structure; the synchronous wheel 134 may be provided with teeth adapted to the tooth structure of the synchronous belt 135, so that when the gear 139 drives the synchronous wheel 134 to rotate via the transmission shaft 137, the synchronous wheel 134 can drive the synchronous belt 135 to move, and then drive the slide 143 to slide along the supporting slide rail 133. The synchronous belt idler 136 is configured to adjust the movement direction of the synchronous belt 135 on the rear side to be opposite to the movement direction on the front side, so that the synchronous belt 135 may move along a preset circular route, and may have a certain tension effect on the synchronous belt 135.

Where the synchronous belt idler 136 may be in connection with the supporting slide rail 133 via a rotation shaft, the synchronous belt idler 136 may rotate relative to the supporting slide rail 133, so as to be beneficial to the movement of the synchronous belt 135. Of course, the synchronous belt idler 136 may also be fixed relative to the supporting slide rail 133.

In other examples, the first driving wheel and the second driving wheel may also be a belt wheel, and correspondingly, the annular connecting member may be a belt (e.g., the synchronous belt 135), and there is a certain friction between the belt and the slide 143, so that the belt can drive the slide 143 to move; or, the first driving wheel and the second driving wheel are a sprocket, the annular connecting member may be a chain, the chain may be fixedly connected with the slide 143, so that the chain may drive the slide 143 to move.

Optionally, the electric cylinder 142, the annular connecting member and the rack 140 are provided side by side and spaced apart; the annular connecting member is located between the electric cylinder 142 and the rack 140, which is beneficial to the structural compactness of the lifting apparatus 13.

In one possible implementation, the supporting slide rail 133 includes a support body 1331 and two linear rails 1332 mounted to the support body, the two linear rails 1332 are provided in parallel and at an interval, and the slide 143 cooperates with the two linear rails 1332. Where the support body 1331 may include two slide rail side walls; or, the support body 1331 include the slide rail side wall and the connecting board. The two linear rails 1332 may be respectively provided at both sides of the two slide rail side walls.

By setting the linear rail 1332, the slide 143 may be accurately guided to reciprocate along the upper and lower direction, which is beneficial for the accuracy and the stability of the movement of the slide 143 and the image acquisition device.

Exemplarily, the linear rail 1332 may be connected with the supporting slide rail 133 via fastening connection, snapping and other connection methods, so as to facilitate the disassembly and assembly of the linear guide rail 1332. The linear rail 1332 may also be connected with the support slide rail 133 by welding, bonding and other connection methods, so as to improve the connection reliability. The linear rail 1332 may include a rail body and at least one slider provided slidably on the rail body, the slider is configured to be connected with the slide 143, so as to drive the slide 143 to slide up and down along the rail body; the slider may be in connection with the slide 143 via fastening connection, snapping and other connection methods, so as to facilitate the disassembly and assembly of the slide 143; the slider may also be in connection with the slide 143 by welding and other connection ways, so as to facilitate the connection reliability between them.

The structure of the slide 143 may be a conventional setting in the field, in the present embodiment, the structure of the slide 143 is not specifically limited; the image acquisition device 15 may adopt a conventional setting in the field, the image acquisition device 15 may adopt a camera commonly used in the field; the matching structure between the image acquisition device 15 and the slide 143 may also adopt a conventional setting in the field, such as fastening connection, snapping, etc. which is not specifically limited in the present embodiment.

In one possible implementation, the second end of the electric cylinder 142 is connected with a top seat 141, the top seat 141 may be connected with the supporting slide rail 133 to improve the bearing capacity of the supporting slide rail 133 and the top seat 141; the top seat 141 may extend out of the supporting slide rail 133, so that when the supporting slide rail 133 moves to a lower limit position relative to the side rail 132, the top seat 141 can be rested on the top end of the side rail 132, as shown in FIG. 2, so as to facilitate the side rail 132 and the supporting slide rail 133 to support the electric cylinder 142 together. When the supporting slide rail 133 is at the lower limit position, the supporting slide rail 133 cannot continue to move down relative to the side rail 132; correspondingly, the supporting side rail 133 may also move to an upper limit position relative to the side rail 132, as shown in FIG. 5, and at the same time, the supporting slide rail 133 cannot continue to move up relative to the side rail 132.

In the present embodiment, a transmission radio of the slide 143 to the electric cylinder 142 may reach 2:1; that is, the movement stroke of the slide 143 may be twice the movement stroke of the electric cylinder 142.

A working process of the lifting apparatus 13 in the inspection robot 1 provided by the present embodiment is illustrated below.

Figure 5:
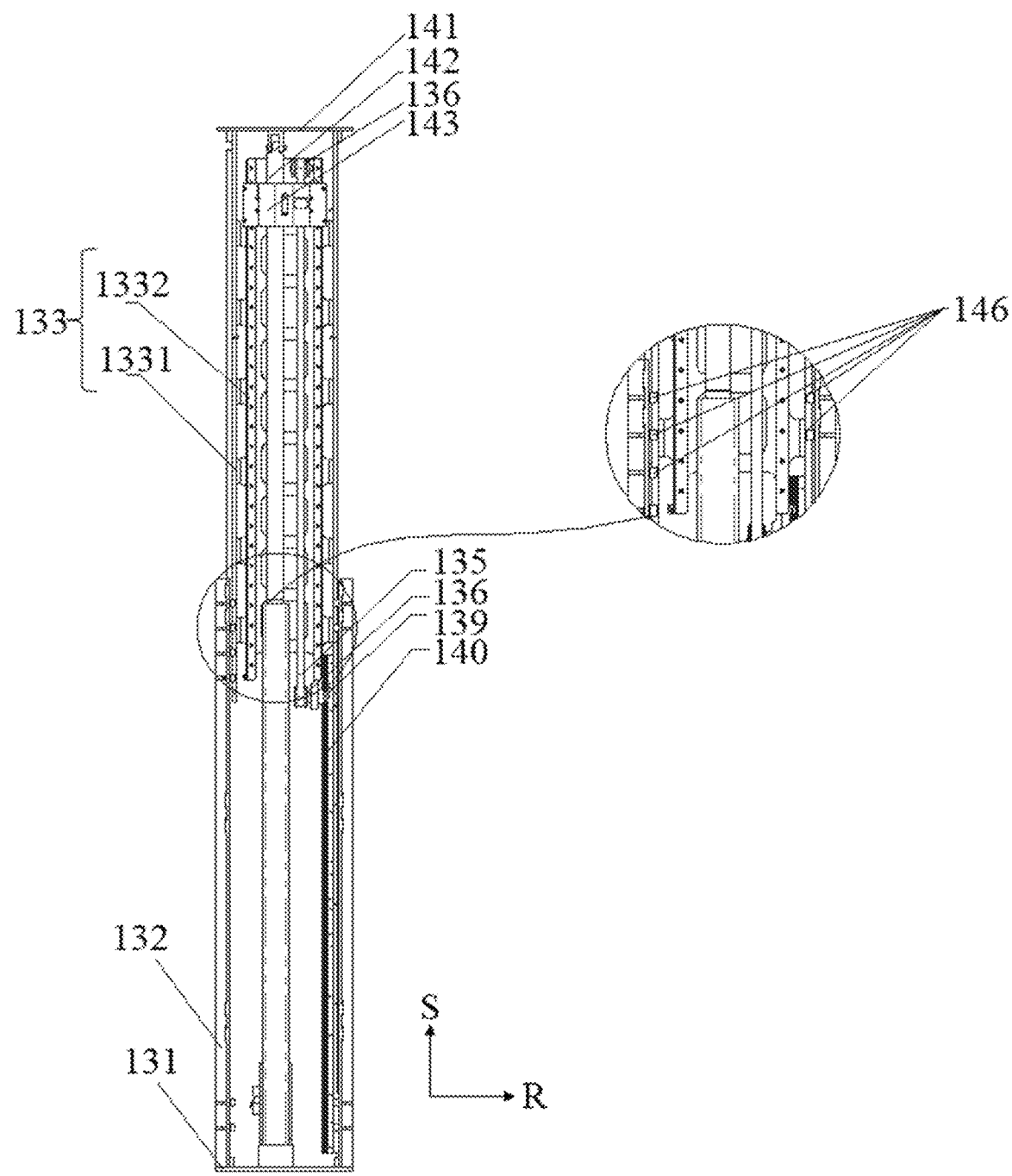
FIG. 5 is a working schematic diagram of a lifting mechanism in an embodiment of the present disclosure.

When the image acquisition device 15 needs to be raised, the electric cylinder 142 is controlled, by the control module of the inspection robot 1, to work, so that the second end of the electric cylinder 142 moves up relative to the first end thereof (the second end moves along the direction away from the first end); the second end of the electric cylinder 142 drives the supporting slide rail 133 to move up relative to the side rail 132; and the supporting slide rail 133 drives the transmission shaft 137 to move up, and the synchronous wheel 134 and the gear 139, which are mounted on the transmission shaft 137, move up accordingly; during the process of the gear 139 moving up, coupled with the engagement effect of the gear 139 with the rack 140, the gear 139 will rotate and drive the transmission shaft 137 and the synchronous wheel 134 to rotate together; and the synchronous wheel 134 drives the synchronous belt 135 to rotate, the synchronous belt 135 drives the slide 143 and the image acquisition device 15 mounted to the slide 143 to move up until the slide 143 and the image acquisition device 15 mounted to the slide 143 move up to a preset position, then the control module may control the electric cylinder 142 to stop moving, the supporting slide rail 133 stops moving accordingly, the gear 139 and the synchronous belt 135 also stop moving, and the slide 143 stops moving, so that the image acquisition device 15 can maintain at the preset position, as shown in FIG. 5.

When the image acquisition device 15 needs to be lowered, the electric cylinder 142 is controlled, by the control module of the inspection robot 1, to work, so that the second end of the electric cylinder 142 moves down relative to the first end thereof (the second end moves along the direction towards the first end); the second end of the electric cylinder 142 drives the supporting slide rail 133 to move down relative to the side rail 132; and the supporting slide rail 133 drives the transmission shaft 137 to move down, and the synchronous wheel 134 and the gear 139, which are mounted to the transmission shaft 137, move down accordingly; during the process of the gear 139 moving down, coupled with the engagement effect of the gear 139 with the rack 140, the gear 139 will rotate and drive the transmission shaft 137 and the synchronous wheel 134 to rotate together; and the synchronous wheel 134 drives the synchronous belt 135 to rotate, the synchronous belt 135 drives the slide 143 and the image acquisition device 15 mounted to the slide 143 to move down, until the slide 143 and the image acquisition device 15 mounted to the slide 143 move down to a preset position, then the control module may control the electric cylinder 142 to stop moving, the supporting slide rail 133 stops moving accordingly, the gear 139 and the synchronous belt 135 also stop moving, and the slide 143 stops moving, so that the image acquisition device 15 can maintain at the preset position, as shown in FIG. 2.

In one possible implementation, the robot body of the inspection robot 1 further includes a supporting frame 16 provided on the robot chassis 11, a side rail 132 of the lifting apparatus 13 is connected with the supporting frame 16.

In addition, for the structure of the inspection robot 1, the part not described in the present embodiment can adopt a conventional setting in the art, and the present embodiment does not specifically limit this.

The present embodiment further provides a lifting apparatus. The structure, function and implementation process of the lifting apparatus can be the same as or similar to the lifting apparatus in any of the foregoing embodiments, and will not be repeated in the present embodiment.

The image acquisition device according to the present disclosure has a large stroke, and it is beneficial to reduce the size of the lifting mechanism, and further reduce the cost.

The technical effect of the inspection robot of the present disclosure is: the inspection robot 1 has a large movement range in a height direction thereof to perform the collection of the image data without need of providing multiple image acquisition devices 15 along an upper and lower direction, which can be implemented by the lifting apparatus 13 in embodiments of the present disclosure, it is beneficial to reduce the cost of the inspection robot.

In the description of the present disclosure, it should be understood that the orientations or position relationships indicated by the terms "up", "down", "front", "rear", "left", "right", "top", "bottom", "inner", "outer", etc. is based on the orientations or position relationships shown in the accompanying drawings, only for the convenience of describing the present disclosure and simplification of the description, rather than indicating or implying that the apparatus or element must have a specific orientation, be constructed and operated in a specific orientation, and thus they cannot be understood as a limitation of the present disclosure.

In the present disclosure, unless otherwise specified and limited, the terms "mount", "connect", "connection", "fix" and other terms shall be understood in a broad sense, for example, they can be a fixed connection, a detachable connection, or integrated; they can be a mechanical connection, electrical connection or communication with each other; they can be directly connected or indirectly connected through an intermediate medium; they can be an internal communication between two elements or interaction relationship between two elements. For those skilled in the art, the specific meanings of the above terms in the present disclosure can be understood according to specific situations.

In the above description, the description referring to the terms "one embodiment", "some embodiments", "examples", "specific examples", or "some examples" means that the specific features, structures, materials or features described in combination with the embodiments or examples are included in at least one embodiment or example of the present disclosure. In the present description, the schematic expression of the above terms does not have to be for the same embodiments or examples. Furthermore, the specific features, structures, materials or features described may be combined in any one or more embodiments or examples in a suitable manner. In addition, without contradiction, those skilled in the art can merge and combine the different embodiments or examples described in the description and the features of the different embodiments or examples.

Finally, it should be noted that the above embodiments are only used to illustrate the technical solutions of the present disclosure, not to limit them; Although the present disclosure has been described in detail with reference to the above embodiments, those skilled in the art should understand that they can still modify the technical solutions recorded in the above embodiments or equivalently replace some or all of the technical features therein; and these modifications or replacements do not make the essence of the corresponding technical solution depart from the scope of the technical solutions of the embodiments of the present disclosure.

The invention claimed is:

1. A lifting apparatus of an inspection robot, which is mounted to a body of the inspection robot, comprising:
   a mounting base, configured to be mounted to a robot body of the inspection robot;
   an electric cylinder with a first end and a second end opposite to the first end, with the first end being connected with the mounting base;
   a side rail, connected with the mounting base;
   a supporting slide rail, slidably connected with the side rail and connected with the second end of the electric cylinder, so that the electric cylinder drives the supporting slide rail to slide relative to the side rail;
   a driving mechanism, mounted to the supporting slide rail;
   a slide, configured to mount an image acquisition device, where the slide is connected with the driving mechanism, and the slide is slidably connected with the supporting slide rail, so that the driving mechanism is capable of driving the slide to slide relative to the supporting slide rail; and a rack, connected with at least one of the mounting base and the side rails, wherein the driving mechanism comprises:
- a transmission shaft, connected, by a bearing, with a bottom of the supporting slide rail facing the mounting base;
- a gear, disposed at one end of the transmission shaft, and engaged with the rack;
- a first driving wheel, disposed at the other end of the transmission shaft;
- a second driving wheel, disposed at a top end of the supporting slide rail and opposite to the first driving wheel; and
- an annular connecting member, disposed around the first driving wheel and the second driving wheel, and connected with the slide.

2. The lifting apparatus according to claim 1, wherein the first driving wheel comprises:
- a synchronous wheel, disposed at the other end of the transmission shaft;
- a synchronous belt idler, disposed at the top end of the supporting slide rail and opposite to the synchronous wheel; and
- a synchronous belt, connected with the synchronous wheel and the synchronous belt idler; with the synchronous wheel being connected with the slide.

3. The lifting apparatus according to claim 1, wherein:
the electric cylinder, the annular connecting member and the rack are disposed side by side and at intervals; and
the annular connecting member is located between the electric cylinder and the rack.

4. The lifting apparatus according to claim 1, wherein:
the supporting slide rail comprises two opposite and parallel slide rail side walls;
one slide rail side wall is provided with a bearing hole, and the bearing is provided in the bearing hole;
the gear is located on an outer side of the slide rail side wall with the bearing hole and facing the side rail; and
the first driving wheel is located on an inner side of the slide rail side wall with the bearing hole.

5. The lifting apparatus according to claim 1, wherein:
the supporting slide rail comprises a support body and two linear rails mounted to the support body;
the two linear rails are provided in parallel and at an interval; and
the slide cooperates with the two linear rails.

6. The lifting apparatus according to claim 1, wherein the side rail is provided with a guide slot, and wherein:
- a side edge of the supporting slide rail is slidably provided in the guide slot; or
- the side edge of the supporting slide rail is provided with a roller, and the roller is rollably provided in the guide slot.

7. The lifting apparatus according to claim 1, wherein:
the second end of the electric cylinder is connected with a top seat, and the top seat is connected with the supporting slide rail; and
the top seat is configured to be rested on a top end of the side rail when the supporting slide rail moves to a lower limit position relative to side rail.

8. The lifting apparatus according to claim 1, wherein:
the side rail consists of a plurality of side rails;
the plurality of side rails are provided in parallel and at intervals; and
two of the plurality of side rails are respectively provided at both sides of the supporting slide rail.

9. An inspection robot, comprising a robot body and a lifting apparatus mounted to the robot body of the inspection robot, wherein the lifting apparatus comprises:
- a mounting base, configured to be mounted to a robot body of the inspection robot;
- an electric cylinder with a first end and a second end opposite to the first end, with the first end being connected with the mounting base;
- a side rail, connected with the mounting base;
- a supporting slide rail, slidably connected with the side rail and connected with the second end of the electric cylinder, so that the electric cylinder drives the supporting slide rail to slide relative to the side rail;
- a driving mechanism, mounted to the supporting slide rail;
- a slide, configured to mount an image acquisition device, where the slide is connected with the driving mechanism, and the slide is slidably connected with the supporting slide rail, so that the driving mechanism is capable of driving the slide to slide relative to the supporting slide rail; and
- a rack, connected with at least one of the mounting base and the side rail;

wherein the driving mechanism comprises:
- a transmission shaft, connected, by a bearing, with a bottom of the supporting slide rail facing the mounting base;
- a gear, disposed at one end of the transmission shaft, and engaged with the rack;
- a first driving wheel, disposed at the other end of the transmission shaft;
- a second driving wheel, disposed at a top end of the supporting slide rail and opposite to the first driving wheel; and
- an annular connecting member, disposed around the first driving wheel and the second driving wheel, and connected with the slide.

10. The inspection robot according to claim 9, wherein the robot body comprises a supporting frame provided on a robot chassis, and a side rail of the lifting apparatus is connected with the supporting frame.

11. The inspection robot according to claim 9, wherein the first driving wheel comprises:
- a synchronous wheel, disposed at the other end of the transmission shaft;
- a synchronous belt idler, disposed at the top end of the supporting slide rail and opposite to the synchronous wheel; and
- a synchronous belt, connected with the synchronous wheel and the synchronous belt idler, with the synchronous wheel being connected with the slide.

12. The inspection robot according to claim 9, wherein:
the electric cylinder, the annular connecting member and the rack are disposed side by side and at intervals; and
the annular connecting member is located between the electric cylinder and the rack.

13. The inspection robot according to claim 9, wherein:
the supporting slide rail comprises two opposite and parallel slide rail side walls;
one slide rail side wall is provided with a bearing hole, and the bearing is provided in the bearing hole;

the gear is located on an outer side of the slide rail side wall with the bearing hole and facing the side rail; and the first driving wheel is located on an inner side of the slide rail side wall with the bearing hole.

14. The inspection robot according to claim 9, wherein:

the supporting slide rail comprises a support body and two linear rails mounted to the support body;

the two linear rails are provided in parallel and at an interval; and the slide cooperates with the two linear rails.

15. The inspection robot according to claim 9, wherein the side rail is provided with a guide slot; and wherein:

a side edge of the supporting slide rail is slidably provided in the guide slot; or the side edge of the supporting slide rail is provided with a roller, and the roller is rollably provided in the guide slot.

16. The inspection robot according to claim 9, wherein:

the second end of the electric cylinder is connected with a top seat, and the top seat is connected with the supporting slide rail; and the top seat is configured to be rested on a top end of the side rail when the supporting slide rail moves to a lower limit position relative to side rail.

17. The inspection robot according to claim 9, wherein:

the side rail consists of a plurality of side rails;

the plurality of side rails are provided in parallel and at intervals; and two of the plurality of side rails are respectively provided at both sides of the supporting slide rail.

\* \* \* \* \*